United States Patent [19]

Henderson

[11] Patent Number: 4,786,229
[45] Date of Patent: Nov. 22, 1988

[54] DOCUMENT STORAGE AND RETRIEVAL APPARATUS AND METHOD

[76] Inventor: Thomas R. Henderson, 954 Risa Rd., Lafayette, Calif. 94549

[21] Appl. No.: 857,723

[22] Filed: Apr. 30, 1986

[51] Int. Cl.$^4$ ............................................. B65G 63/00
[52] U.S. Cl. .................................. 414/786; 414/286; 414/273; 414/274; 414/120; 364/478; 364/479; 209/630; 209/659
[58] Field of Search ............... 414/786, 266, 267, 279, 414/281, 286, 273, 274, 275, 277, 278, 134, 135, 136, 120, 121, 122, 416, 417; 364/478, 479; 209/630, 659; 221/11; 198/341, 356, 358

[56] References Cited

U.S. PATENT DOCUMENTS

| | | | |
|---|---|---|---|
| 3,351,219 | 11/1967 | Ruderfer | 414/274 |
| 3,434,604 | 3/1969 | Haldimann et al. | 414/286 X |
| 3,482,712 | 12/1969 | Powers . | |
| 3,526,326 | 9/1970 | Castaldi . | |
| 3,531,002 | 9/1970 | Lemelson . | |
| 3,536,194 | 10/1970 | Novak . | |
| 3,866,767 | 2/1975 | Zollinger et al. | 414/279 |
| 4,219,296 | 8/1980 | Fujii et al. . | |
| 4,285,623 | 8/1981 | Stephens . | |
| 4,362,454 | 12/1982 | Kripzak | 414/267 X |
| 4,669,047 | 5/1987 | Chucta | 414/274 X |
| 4,678,390 | 7/1987 | Bonneton et al. | 414/286 X |

FOREIGN PATENT DOCUMENTS 27177 3/1979 Japan .................................. 414/273

OTHER PUBLICATIONS

Mechanical Handling–Jun. 1969–pp. 104 and 105.

Primary Examiner—Frank L. Werner
Attorney, Agent, or Firm—Flehr, Hohbach, Test, Albritton & Herbert

[57] ABSTRACT

A document and storage retrieval system including a plurality of containers, each having machine readable identifying indicia thereon. The containers are positioned by automatic palletizing apparatus on each of a plurality of pallets. The identity of the containers on each pallet is correlated with a storage location address assigned by a controller. Additionally identifying indicia for the pallet is preferably correlated to the address. On retrieval of a selected container, the pallet is retrieved, all of the containers are removed from the pallet, the selected container is sorted from the remaining containers, and all of the remaining containers are repalletized and reassigned a new address in the storage volume. The address or location of containers in the storage volume is dynamically changing, but the controller for the system always has a correlation of container identities and storage location addresses.

11 Claims, 3 Drawing Sheets

FIG_1

FIG_2

FIG_4

FIG_3

FIG _ 5

DOCUMENT STORAGE AND RETRIEVAL APPARATUS AND METHOD

BACKGROUND OF THE INVENTION

The present invention relates, in general, to the storage and retrieval of articles and, more particularly, to a document storage and retrieval system.

The need to retain or store documents has increased substantially in recent years. Governmental agencies are a prolific source of rules and regulations which require industry to maintain documentary evidence relating to an ever broadening range of subjects. Similarly, the exposure to litigation has increased almost everyone's need to retain documents. As the cost of space increases, particularly office space, there has been a tendency to move document storage to an off-site location or storage facility.

Since it is often not feasible for a company to store its documents in-house, document storage is frequently undertaken through a contractor at a storage facility at the periphery of an urban area. In recent years, therefore, document storage companies have come into existence and are operating storage facilities in which literally millions of documents are stored.

As the number of documents stored increases, the problems associated with storage and retrieval also increase. Small storage and retrieval contractors have simply tried to accumulate their various clients' documents in contiguous areas in the storage warehouse. As these systems increase in volume, the tendency has been to employ an approach similar to the warehousing of fungible products such as hardware, groceries or the like. Thus, the article is placed in a suitable container, and the container stored in a numbered location in the storage facility. If an article is to be retrieved, the container is recalled from the numbered storage location and the article removed from the container. The container will thereafter be returned to its numbered storage location, either without the article or when the article is a document, when the document is returned and refiled in the container. When this approach is employed, each location in the storage volume is given an identifying address and the container has an identifying indicia, often machine readable, which corresponds to the address.

The approach of assigning a constant address to a container is particularly suitable for use with fungible products. Thus, if the container is filled with bolts of the same size or cartons of laundry soap, removal of an article from the container does not pose a serious problem. The container can be replenished with articles soon after retrieval. Since each document generally will be unique, removal of a document from the container will usually result in the container with the remaining documents being pulled from the inventory of stored documents, which leaves a gap in the inventory that will remain until the container is replaced. As the volume of documents or containers increases, the number of gaps in the inventory of stored documents resulting from container retrievals dramatically increases. Thus, storage and retrieval systems which are based on constant addresses inherently do not maximize the density of the storage volume.

Various automated systems have been employed in an attempt to automate the storage and retrieval of documents and other articles. Typical of such automated systems are the apparatus and methods set forth in U.S. Pat. Nos. 4,285,623; 4,219,296; 3,536,194; 3,526,326; 3,531,002; and 3,482,712. While these automated storage and retrieval systems have devised certain scanning and container manipulating apparatus and controllers which greatly facilitate automation, they basically implement the automation by the use of a constant address system. Thus, to the extent that such automated storage and retrieval apparatus and methods are suitable for use with documents, they do not eliminate the problem of inefficient use of the storage volume by reason of gaps resulting when documents are retrieved.

An additional problem which results from assignment of a constant address to containers for documents or other articles is that the retrieval from the inventory of stored containers will tend to be somewhat random, with the gaps or locations not occupied in the storage volume being randomly distributed throughout the volume. Thus, the storage and retrieval equipment must operate throughout a greater storage volume, with the distance and time to store and retrieve documents being increased by the need for the equipment to pass beyond the various gaps in the storage volume. There is, therefore, no compaction of the volume toward the conveying equipment, and the path through which the containers must travel to be stored or retrieved can be minimized. The random empty locations in constant-address systems increases the inventory volume and causes the automatic conveying apparatus used to operate warehouse to move over longer and longer paths as the inventory volume increases. The density of the storage volume and its proximity to the automatic handling equipment in a constant address system is reduced by the retrieved containers.

In an inventory of one million containers, each filled with documents, a typical inventory handling rate would be about two percent per month, i.e., about 20,000 containers are handled with about 10,000 retrieved and about 10,000 stored. Of the 10,000 retrieved containers about 4,000 are forwarded back to the customer in their entirety and about 6,000 have one or more documents returned to the customer. When a document is pulled from a container, the container must be stored in a suspense storage volume or returned to the long term storage inventory. If the container is returned, it must be retrieved a second time and restored when the document is returned. This approach increases the handling rate by about 12,000 containers per month. If the 6,000 containers are stored in suspense storage, for example, for three months, the number of gaps in the long term inventory increases to 30,000 (assuming the 4,000 sent to the customers are also retained for three months).

In a constant address system, therefore, the container handling problems and the gaps in the long term inventory become substantial. Typically about one man per 11,000 containers or 90 men for a one million container inventory are required and the running volume of randomly distributed gaps can exceed 45,000 cubic feet.

OBJECTS AND SUMMARY OF INVENTION

A. OBJECTS OF INVENTION

Accordingly, it is an object of the present invention to provide a document storage and retrieval system in which the overall volume of the inventory of the storage system is reduced and the density of storage is increased.

It is a further object of the present invention to provide a method and apparatus for the storage and retrieval of articles from a storage volume which enables minimization of the length of the storage and retrieval paths for enhanced efficiency of operation of the automatic handling equipment.

A further object of the present invention is to provide an automated document storage and retrieval system in which the number of personnel required to run the system is minimized and the time required to store and retrieve documents from the inventory is minimized.

Still a further object of the present invention is to provide a document storage and retrieval apparatus and method which is capable of handling a very high inventory volume, is highly efficient in the removal of inventory for destruction, is suitable for use with non-standard size containers as well as standard size containers and includes a control system having extreme and verifiable accuracy.

The document storage and retrieval system of the present invention has other objects and features of advantage which will become apparent from, or are set forth in more detail in, the accompanying drawing and following description of the preferred embodiment.

B. SUMMARY OF THE INVENTION

The storage and retrieval method of the present invention is comprised of the steps of storing a plurality of containers having identifying indicia thereon in a storage structure having a plurality of locations with location identifying addresses, and periodically retrieving selected containers from the storage structure. The improvement in the method of the present invention is comprised, briefly, of the steps of prior to the storing step, placing a plurality of containers on a pallet or carrier; correlating all of the container identifying indicia of the containers on the pallet with location identifying indicia for the location selected in the storage volume; during the storing step, storing the pallet at the selected location; during the retrieving step, retrieving the pallet having the selected container thereon; after the retrieving step, removing containers from the retrieved pallet; after the removing step, isolating the selected container from the remainder of the containers; and returning the remainder of the containers to the stored inventory with new containers sufficient to fill the pallet and assigning the full pallet a new address in the inventory.

The storage and retrieval apparatus of the present invention includes a plurality of containers each having machine readable container identifying indicia thereon; means for storing said containers at locations in a storage volume; means for retrieving the containers from the locations in the storage volume; and control means coupled to control operation of the means for storing and the means for retrieving. Improvement in the storage and retrieval apparatus is comprised, briefly, of a plurality of pallets each formed for support of a plurality of containers thereon; palletizing means coupled to the control means to place the containers on the pallets; conveying means formed to convey the pallet with containers thereon to a location selected by the control means; scanning means positioned for reading the indicia on the containers and coupled to the control means for communicating signals thereto; the control means correlating signals from scanning means to store signals identifying the indicia for all the containers on the pallet with the address of the selected storage location; the control means being responsive to input identifying a selected container to convey the pallet having the container thereon to depalletizing means; depalletizing means formed to remove all of the containers from the pallet; conveying means conveying the containers passed scanning means; the control means being responsive to scanning signals to isolate the selected container from a remainder of the containers; and the conveying means conveying the remainder of the containers to the palletizer for palletizing with other containers to form a new pallet full of containers; and the control means being formed to reassign a location to the new pallet and recorrelate the container identifying indicia to the new address in response to scanning signals.

DESCRIPTION OF THE PREFERRED EMBODIMENT

A. CONTAINERS

The storage and retrieval apparatus and method of the present invention are particularly designed for use in connection with documents. As will be understood, however, the system can also be used to store and retrieve other articles. When documents are involved, it is preferable that the documents be placed in a container, such as a carton or box, that will allow a plurality of documents to be positioned in the container. In systems employing the apparatus and method of the present invention to store articles other than documents, a plurality of the articles also can be positioned in a container so that all of the articles or all of the documents are stored and retrieved as a unit. If only a single article is placed in the container or only a single document, the container and document or article, in effect, are merged as the unit being stored or retrieved.

Accordingly, as used herein, the expression "container" shall mean the smallest unit which is identified for storage and retrieval using the apparatus and method of the present invention. In some instances the container actually may be dispensed with and the document or article will have the identifying indicia directly attached thereto or carried thereby. In most applications, however, a plurality of documents are stored in a container which carries identifying indicia.

Figure 1:
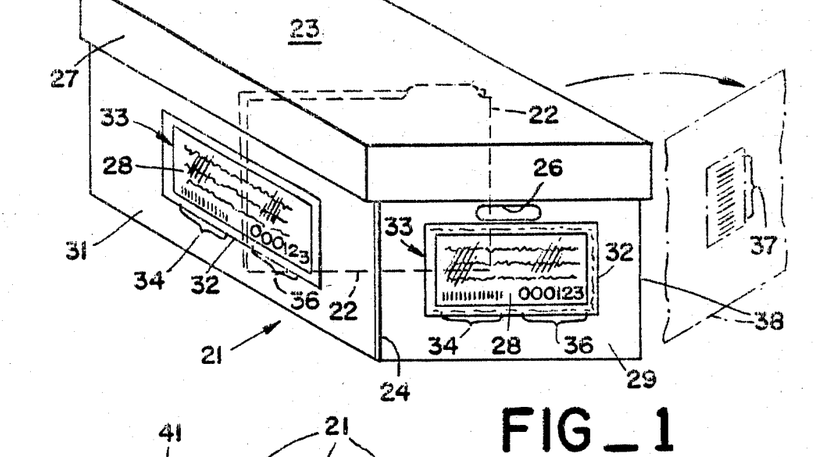
FIG. 1 is a top perspective view of a container for use with the document storage and retrieval system of the present invention, showing the far side of the container in a moved position in phantom.

As seen in FIG. 1, it is preferable to provide a container, generally designated 21, which is dimensioned for receipt of documents as may be contained, for example, in a file 22. Most preferably, container 21 is formed to receive letter size documents in an orientation shown by file 22 and legal size files or documents (not shown) oriented at 90 degrees to the orientation of file 22 in FIG. 1. Accordingly, container 21 is preferably about 17 inches by 14 inches by 11 inches in height, and has sufficient strength to carry approximately 35 pounds in weight.

Container 21 can advantageously be formed as a folded cardboard carton with double walls in all of the walls except the carton top wall 23. Moreover, it is preferable that the carton be a knock-down carton that is folded to produce the double walls. Container 21 has a minimum number of seams which require sealing, for example, one seam along vertically extending corner 24. Additionally, the carton preferably includes die cut openings 26 on the end panels to permit the cartons to be manually manipulated. Carton lid 27 may be retained on the body of the carton by gravity and frictional engagement with the carton walls. Containers constructed as above described are broadly known in the document storage and retrieval industry.

Since the document storage and retrieval system of the present invention includes automated container handling equipment, it is preferable that the system be employed with containers 21 which are all of substantially the same size. There are, however, many situations which require the storing of documents or other articles which cannot be stored in a standard letter/legal size container 21, and accordingly the document storage and retrieval system of the present invention contemplates use of non-standard containers. Thus, $16 \times 13 \times 10$ inch containers or $16 \times 10 \times 4\frac{1}{2}$ inch containers or $26 \times 17 \times 11$ inch containers also can be readily employed with the system of the present invention.

Containers 21 used in the system of the present invention include container identifying indicia, and preferably include both machine readable and human readable identifying indicia, which are carried on container 21 to permit correlation of the identity of the container with a location in the storage structure. Most preferably, in the present system the container identifying indicia are provided on control slips 28 mounted to an end wall 29 and a side wall 31 of the container. While it will be possible to permanently mount or imprint the identifying indicia on walls 29 and 31, in the system of the present invention it is preferable that slips 28 be removably mounted to the container walls by positioning the same in pockets 32 adhesively secured to the container's side and end walls. Pockets 32 have an opening at an end 33 to enable slip 28 to be mounted in and removed from pockets 32.

Control slips 28 preferably include a bar code 34 having machine readable identifying indicia which are unique to the particular container. Additionally slips 28 include a human readable indicia 36 identifying the container to enable warehousemen to visually check the identity of containers. Both indicia 34 and 36 are preferably preprinted on slips 28, which control slips come in sets of four in a manner which is described in more detail hereinafter. Slips 28 further preferably include an area in which other information, such as a description of the articles or documents in the container, can be entered, as well as the name and identifying information as to the person storing the document.

Container 21 further preferably includes a bar code 37 positioned on side wall 38 opposite side wall 31 on which one of the control slips is mounted. Side wall 38 is shown in FIG. 1 in phantom in a moved position, as is bar code 37. Bar code 37 preferably is a Uniform Product Counsel (UPC) bar code which may be permanently affixed to container 21, for example, by printing the same directly on the container. Bar code 37 indicates whether or not container 21 is a standard size container, in this case $17 \times 14 \times 11$ inch container, or an odd size container, and bar code 37 is used in a container sorting process which also is described in more detail below.

B. PALLETS

Figure 2:
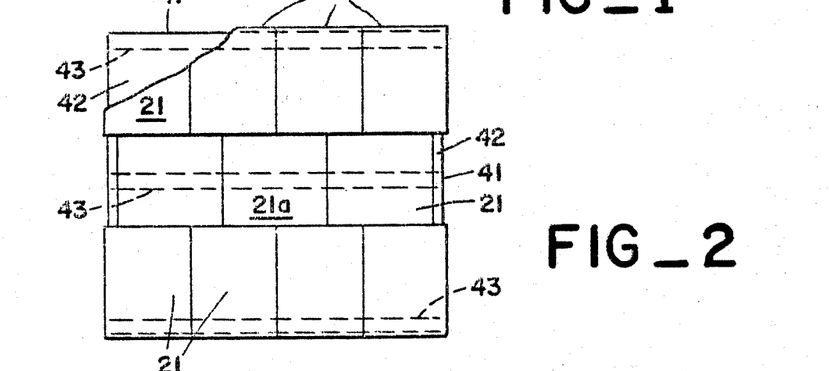
FIG. 2 is a top plan view, in reduced scale and partially broken away, of a pallet having a plurality of containers constructed as shown in FIG. 1 positioned thereon.

The document storage and retrieval system of the present invention is based upon placing a plurality of containers 21 on a common carrier means, such as a forklift pallet. Systems in which an individual container is stored in its individual volume or location require storage structures which are relatively complex and/or an undesirably active and complex container conveying system. Accordingly, the apparatus and method of the present invention employ a system in which a plurality of containers 21 are positioned on pallet means 41 in an array dictated by the size of the containers. For a standard $17 \times 14 \times 11$ inch container, the containers may be positioned as shown in FIG. 2, with 11 containers positioned in a layer on a 54 inch by 48 inch pallet. Pallet 41 is preferably a double-face, non-reversible forklift pallet with a three-fourth inch solid plywood upper face 42 for support of containers 21 thereon and longitudinally extending members 4 which define longitudinally extending spaces for receipt of the tines of a forklift truck therebetween. The bottom of pallet 41 may have transverse members and/or panels (not shown) which permit conveying and are spaced to interlock with support frame members or racks in the storage structure. Such pallet constructions are well known.

As will be understood, other sizes of pallets and other arrays of containers on the pallet are suitable for use with the apparatus and method of the present invention. One of the advantages of the array as shown in FIG. 2, however, is that all of the containers except container 21a at the center of the array have an end panel which is visible from the periphery of the pallet. Accordingly, warehousemen or operators can read the human-readable indicia 36 on the control slips for virtually all of the containers on a pallet.

It is further preferable that each pallet 41 carry its own identifying indicia. As was the case for containers 21, such indicia preferably are machine readable and human readable, and they are preferably permanently placed on all four sides of the pallet.

C. AUTOMATED CONTAINER HANDLING EQUIPMENT

The document storage and retrieval apparatus and method of the present invention is designed to be completely automated. It is contemplated, for example, that a document storage and retrieval inventory of one million containers can be operated by one operator for every 100,000 containers with any document in the one million case inventory being retrieved in 3–5 minutes. By contrast, using conventional document storage and retrieval techniques, "large" systems are currently operating with inventories less than 400,000 containers which require about 1 operator per 11,000 containers and retrieval times of 15 minutes, or more for a selected container.

Figure 3:
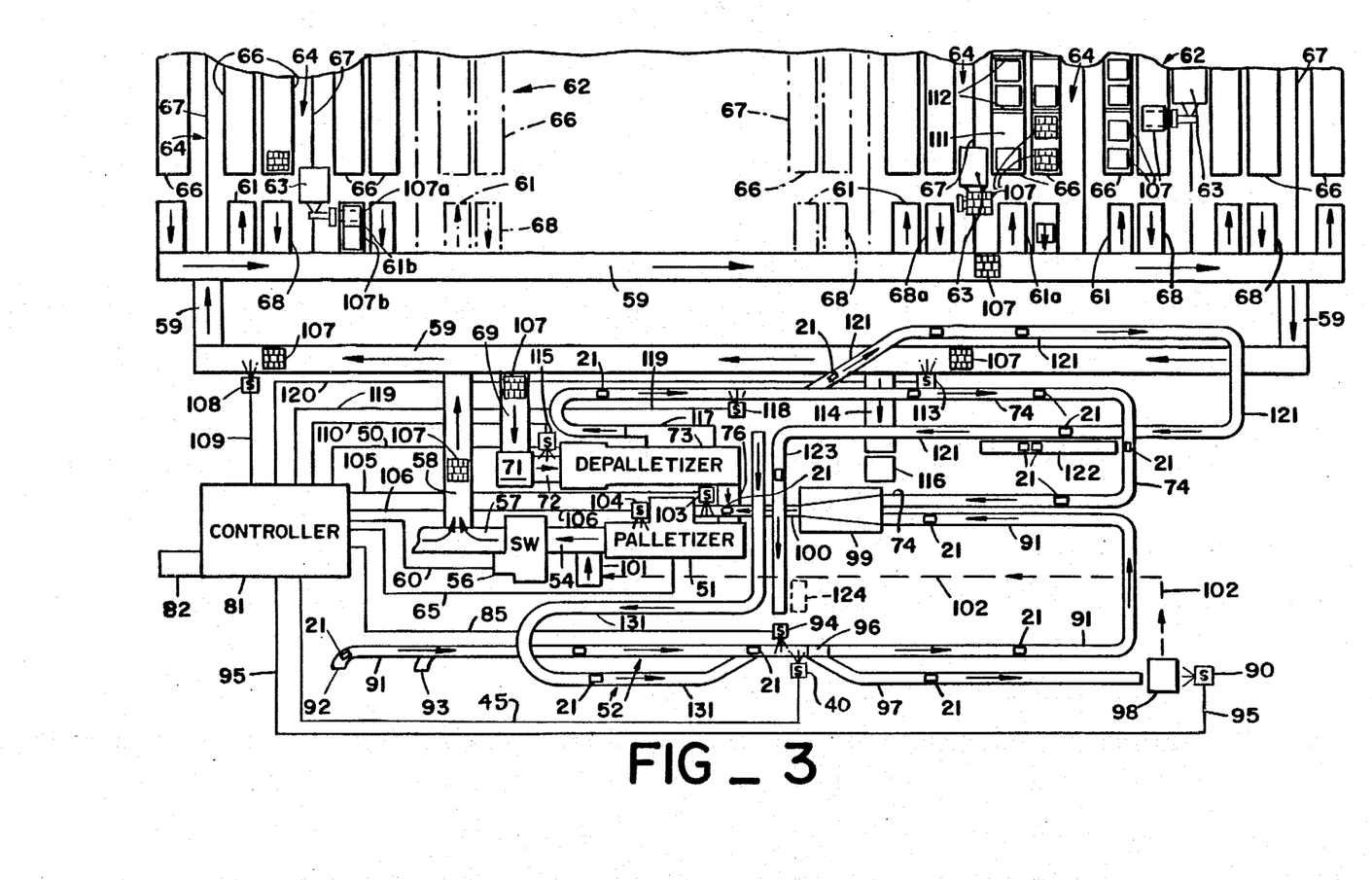
FIG. 3 is a top plan schematic representation of a document storage and retrieval layout constructed in accordance with the present invention.

Referring now to FIG. 3, the major components of the automated container handling equipment can be described.

1. Palletizer

An automatic palletizer 51 is provided in order to position or place a plurality of containers 21 onto pallets 41. Such palletizers are well known in the industry and are capable of positioning standard containers in various arrays on a pallet, including the array shown in FIG. 2. Typical of such automated palletizing equipment suitable for use in the present invention is the von Gal palletizer Model P7900 manufactured by Linton Industrial Automation Systems, Inc. of Hebron, Kentucky.

The von Gal P7900 palletizer is capable of loading 55 containers on a pallet in five layers as shown in FIG. 2 in one minute. The von Gal P7900 palletizer receives containers from an input conveyor 91 and a return or recycle conveyor 74. Pallets are input through a pallet conveyor or elevator (not shown) and the output of palletizer 51, a palletized load of containers 107, exits the palletizer on conveyor 54.

2. Shrinkwrapper

Downstream of palletizer 51 the system of the present invention preferably includes an automated shrinkwrapper 56 shown in the drawing and labeled as "SW." Such automated shrinkwrapping equipment capable of applying a shrinkwrap film to a loaded pallet of the size previously described is also well known in the industry. The Model SHASP H-Series automatic shrinkwrapper of Zellerbach Paper Company of Emeryville, California is well suited for use in the present system.

Most preferably the palletized containers are wrapped with 90 gauge, linear density, polymer film, which helps protect the contents of the containers from contamination by dust, debris and moisture. Since the storage area has an extensive automatic sprinkler system to minimize the fire hazard, shrinkwrapping prevents soaking of documents in the event of triggering of the sprinkler system.

The output pallet conveyor 57 conveys pallets to a transfer pallet conveyor 58 and from there to a warehouse pallet conveyor loop 59. Palletized and shrinkwrapped containers are conveyed on loop 59 past a plurality of aisle input conveyors 61, which are positioned at the ends of the aisles of the storage structure.

3. Forklift Trucks

Once the pallets are delivered to the input conveyors 61 proximate aisles of a pallet storage structure, generally designated 62, the pallets are positioned in the structure by a plurality of forklift trucks 63.

While various automated forklift trucks would be suitable for use with the storage and retrieval system of the present invention, it is most preferable that the forklift truck be a turret-lift truck, as for example is manufactured by Yale Lift Truck Company of Sacramento, California. Turret-lift truck 63 can operate in aisles 64 between storage rack structures 66 which are of minimum width. It is most preferable that lift trucks 63 be completely automated, and in this respect, aisles 64 may each be provided with a cable 67 buried in the floor of aisles 64 which is used to transmit control signals to lift trucks 63 in a manner which will be described in more detail hereinafter.

4. Depalletizer

During the retrieval portion of the method of the present invention, pallets are conveyed by the output conveyors 68 proximate aisles 64 to pallet conveyor loop 59 and by a pallet transfer conveyor 69 to a manual stretchwrap removing station 71. Pallet conveyor 72 conveys the unwrapped pallet to automatic depalletizer 73.

A commercially available depalletizer suitable for use in removing all of containers 21 from pallets 41 is the Litton Industrial Automation Systems, Inc., von Gal Model D8200 depalletizer. The capacity of this depalletizer is also approximately 55 containers per minute, with containers being output from depalletizer 73 onto output conveyor 74 and pallets being recycled by conveyor 76 to palletizer 51.

5. Scanners

The document storage and retrieval system of the present invention employs a plurality of laser scanners, in this case nine scanners marked with the letter "S" which are used to control the flow of containers and pallets through the apparatus of the present invention. Laser scanners capable of reading bar code are well known in the industry, such as the ACCU-SORT Model 70 laser scanner. These scanners can be augmented where necessary with a wand scanner, such as the INTERMEC Model 1241 scanner. Scanners are also provided on lift trucks 63 for scanning storage location addresses on storage racks 66 and bar code on selected pallets.

6. Conveyors

The transfer of containers throughout the present system between the above-described major components is accomplished through container or pallet conveying means. Such conveying means are also well known in the industry and include combinations of gravity roller conveyors, belt conveyors, chain transfer conveyors, Accumaflow conveyors and brake/spacer conveyors. The selection of the combination of conveyors suitable to implement the apparatus of the present invention is well within the ordinary skill of materials handling engineers and will not be described in detail herein.

7. Controller

The storage and retrieval handling apparatus of the present invention includes numerous controllers which are standard components of the above-described major system elements. Thus, palletizer 51, depalletizer 73 and shrinkwrapper 56 all include their own controllers. Similarly, the automated conveying systems include electric eyes which will automatically shut down conveyor lines if they become full of containers and/or pallets, and the lift trucks include their own on-board computers or controllers to process control signals.

Additionally, however, these various component controllers are tied together by a master controller 81, which receives its commands from a computer 82, which is preferably a digital computer. Controller 81 is directly coupled to the computer and is coupled by communication cables or lines 50, 60 and 65 for the receipt and transmission of control signals to and from the depalletizer, shrinkwrapper and palletizer and their respective controllers. Computer 82 additionally includes input means such as a keyboard which enables operator input for cross-checking control and to command the performance of tasks, for example, the retrieval of selected containers. The combination of controller 81 and computer 82 is herein referred as "control means."

A general purpose digital computer suitable for controlling operation of the various components of the document storage and retrieval system of the present invention is an AT&T Model 3B2-300 computer having 144 megabytes of storage capacity and 2 megabytes RAM.

D. SYSTEM OPERATION

The system components above described are all known in the materials handling industry and they can be employed, for example, to store and retrieve containers using a constant address system.

In the storage and retrieval system of the present invention, however, improved density and efficiency of use of the storage volume is achieved by using a dynamic inventory. Instead of assigning each container a permanent address, the containers are reassigned new addresses in the storage volume each time the container is retrieved. Thus, when a pallet of 55 containers is removed from the storage volume in order to allow retrieval of, for example, one container, the other 54 containers are immediately recycled and reassigned newly selected locations in the storage volume.

This process can be more fully described by following containers through the storage and retrieval loops of the layout of FIG. 3.

1. Storing Sequence

Initially, the container is filled with files or documents 22 and the control slips 28 are completed and mounted in transparent pockets 32 on the side and end of the container. The containers will be picked up from the customer's facility and delivered to the storage facility, at which point they will be placed on input conveyor 91 at either of input stations 92 or 93. The infeed conveyors 92 and 93 can be live roller curve conveyors that feed a live roller Accumaflow-LP conveyor 91. The containers are placed on the conveyor 91 with the end control slip facing forward and the slip on side wall 31 facing outwardly (toward the bottom of the page).

Sorting of odd size containers from standard size containers occurs at first scanner 94. Scanner 94 reads the UPC bar code 37 on side wall 38 of the container which faces the scanner. Scanner 94 communicates with controller 81 through line 85 to actuate a section of high speed, pop-up wheel, diverter conveyor 96 which will divert odd size containers onto roller spur 97 for delivery to a manual palletizing station 98. Standard size containers continue down conveyor 91 to a merging section 99 in advance of palletizer 51.

Second scanner 40 reads bar code 34 on container panel 31 to determine whether or not the slip 28 is properly placed in pocket 32 so that subsequent scanners can read the container identifying indicia. If the slip is upside down or backwards or absent from pocket 32, scanner 40 will communicate to controller 45 a "no-read" signal, and the controller will also activate diverter rollers 96 to send the container to odd size container station 98. At station 98 slips 28 can be properly positioned and the container placed back on conveyor 91.

Odd size containers are manually palletized at station 98 and transported by a forklift to a pallet conveyor infeed section 101, preferably a chain transfer conveyor. The path of the forklift is shown as a broken line 102, although it will be understood that the precise path will depend upon the height of the conveyor sections and configuration of the storage warehouse.

In order to enable a correlation of identifying indicia 34 on containers 21 with the pallets on which the containers are placed, a third scanner 103 proximate the input of palletizer 51 reads bar code 34 on side wall 31 of the container. It will be noted that conveyor loop 91 now positions side wall 31 of the incoming containers for reading by a scanner 103 facing the same direction as scanner 94.

Scanner 103 is electrically connected by line 105 to controller 81 and is electrically coupled to palletizer 51. While scanner 40 should eliminate most problems, should scanner 103 fail to read indicia 34 on the side of container 24, the scanner will stop palletizer 51 and illuminate a "carton no read" light. The palletizer operator can then use a hand wand to scan the container number. Once the wand has read the container number, the operator will be able to re-start the palletizer 51. Should the wand also be unable to read bar code 34 on either the side or end of the container, the container will be removed from the system to replace the control slips and/or the container so that the container can be identified and tracked throughout the system.

Each of pallets 41 preferably includes an identifying indicia, such as a bar code and a human readable code, permanently affixed to the pallet. In the preferred form, the pallet identifying bar code is positioned on all four sides of a pallet.

Fourth scanner 104 is also positioned proximate and coupled to palletizer 51 and controller 81 through line 106 to communicate scanning signals to the controller and palletizer. Should the palletizer scanner 104 be unable to read the bar code on the pallet, it will also stop the palletizer and illuminate a "pallet no read" light.

Palletizer 51 palletizes 55 containers onto pallets 41 in five layers and advances the palletized load onto output conveyor 54 to shrinkwapper 56. Infeed conveyor 101 for the odd size carton pallets can also been seen to be upstream of shrinkwrapper 56. Thus, both odd size and standard size pallets are shrinkwrapped before the containers go to the storage structure. Controller 81, by reason of input from scanner 103 85 through line 105 and scanner 104 through line 106 is able to store and correlate scanned signals identifying each of the 55 containers and the pallet.

At station 98 the odd size containers also are scanned by a fifth scanner 90 which is coupled to controller 81 by line 95 so that scanned identifying indicia 34 for the odd size containers also can be stored in computer 82. Additionally, scanner 90 can be used to scan identifying indicia on pallets 41 and computer 82 used to correlate the identities of the containers with the pallets.

The palletized load of containers 107 is then conveyed by chain transfer pallet conveyors 57 58 and 59 past a sixth scanner 10 preferably on main pallet conveyor loop 59. Scanner 108 reads the pallet bar code and communicates the same back to controller 81 through conductor 109 so that the controller can compare the pallet identifying indicia with the pallet indicia scanned at scanners 90 and 104 and in effect provide a hand shake from the palletizer 51 to storage conveyor loop 59.

Once scanner 108 has scanned the loaded pallet 107 and confirmed that it is a pallet previously scanned by scanner 90 or scanner 104, controller 81 will assign a location in storage structure 62, such as location 111 shown in the fourth aisle 64 from the right in FIG. 3 for storing of the loaded pallet.

Computer 82 will have stored in its memory the addresses of all of the locations 111 throughout storage volume or structure 62. Moreover, it will have stored in memory exactly which pallets have been previously stored in the locations and which locations are currently available for pallet storing.

It is further preferable that controller 81 select a location 111 which will minimize the path and/or time along which loaded pallet 107 must be conveyed to reach the selected location. Thus, the computer 82 can be programmed to select a location producing the shortest path to storage. This will tend to produce "orchestra seating" storing of containers in the storage volume, with the exact fanning-out of occupied locations depending on the configuration of the storage volume.

Having assigned the loaded pallet 107 to location 111, controller 81 also controls operation of the conveyor loop 59. The loaded pallet is advanced in the direction of the arrows along loop 59 until it is proximate input conveyor 61a at the selected aisle. The computer then stops the section of conveyor loop 59 in front of the aisle and transfers the load onto input conveyor 61, which advances the loaded pallet to the end of the conveyor. Preferably, each of input conveyors 61 will accept two loaded pallets, such as pallets 107a and 107b on input conveyor 61b in the second aisle from the left in FIG. 3. In the event that two loaded pallets are already positioned on the input conveyor when he loaded pallet reaches input conveyor 61a, the loaded pallet will proceed past input conveyor 61a and continue around loop 59 until the loaded pallet has again reached input conveyor 61a. As will be seen, the pallet will pass in front of scanner 108 during such a loop, and it is possible for the controller to reassign a location for the pallet, although in most cases it will simply recycle the pallet to aisle input conveyor 61a.

Once the loaded pallet has reached aisle input conveyor 61a, feedback to the computer, for example, from an electric eye or limit switch, will cause the computer to send a control signal to the appropriate lift truck 63. In the preferred form of the system of the present invention a single turret-lift 63 can service two aisles with a turn space (not shown) being provided around the ends of racks 66 opposite conveyors 61 and 68. The turret-lift 63, directed by FM communication cable 67, will come to input conveyor 61a and pick up loaded pallet 107. The pallet can then be carried down aisle 64 between storage racks 66. In the storage structure employed in the preferred form of the present invention, storage rack 66 will have a plurality of levels, for example, 5 or 6, with each level having a bay with a pair of locations between the vertically extending support columns or walls 112. Computer 82 will communicate the address of the storage location 111 to the microprocessor on board turret lift 63. The turret-lift is equipped with a scanner (not shown) which can read bar code (not shown) provided at each location 111 in the storage racks. Computer 82, therefore, can communicate to turret lift 63 that the load is going to be placed in a location which is, for example, at level 3 on the left hand side of the double bay. The turret-lift will lift the load up to level 3 an then scan the bay to determine which of the two locations matches the address communicated from control 81. When a match is received, the turret-lift will store the load at location 111 and communicate back to the computer that the load has been stored at the desired location Turret-lift 63 can swing from one side to the other of the aisles at the space between racks 66 and conveyors 61 and 68.

2. Retrieval Sequence

Retrieval of the containers is usually initiated by a retrieval order from a customer, although containers can also be retrieved as part of a document destruction program set up and authorized by the customer or inventory shifting initiated by the storage and retrieval contractor.

Input to controller 81 is made through input computer keyboard identifying the container or containers to be retrieved. The identified containers are then compared to the stored signals from scanners 90 and 103 until a match is reached. Once matched, computer 82 can determine the location or the address of location 111 at which the selected container is stored. Since the selected container is also correlated to a pallet by signals from scanner 104, the pallet on which the selected container is stored also is known.

Computer 82 will communicate a control signal to turret-lift 63 to retrieve the pallet stored at location 111. A lift truck will retrieve the pallet and deposit it on output conveyor 68a for transfer onto the main pallet conveyor loop 59. Transfers onto loop 59 from output conveyors 68 have priority over loaded pallets advancing along the loop. The load is then advanced around loop 59 until it reaches seventh scanner 113. Scanner 113 will scan the identifying indicia on pallet 41 and poll computer 81 through cable 120 for a directive as to whether or not the pallet is to be manually depalletized or automatically depalletized. Thus, all the pallets which are manually palletized at station 98 with odd size containers also are input to the controller to indicate that they must be manually depalletized. If the pallet is an odd size pallet, it will be conveyed off of loop 59 on conveyor 114 to a manual depalletizing station 116. Loaded pallets 107 to be automatically depalletized will proceed along loop 59 until they reach conveyor 69, at which point they will be transferred by controller 81 to conveyor 69 and conveyed to the stretchwrap removal area 71. After completion of the stretchwrap removal, which can be done easily manually, the operator will transfer the loaded pallet onto conveyor 72 to depalletizer 73 for automatic depalletization of the containers. Eighth scanner 115 scans the pallet indicia for controller 81 through cable 110 and handshakes the pallet through cable 50 back to the controller on the depalletizer. Additionally, controller 81 is responsive to signals from scanner 115 to activate ninth scanner 118 to scan for container indicia correlated with particular pallet.

Depalletizer 73 will remove all of containers 21 from the pallets and transfer the pallets by conveyor 76 to palletizer 51 for recycling into the system. The individual containers are transferred to depalletizer output 117 onto a container conveyor 74 in an orientation with side 31 of the containers facing ninth scanner 118. As the containers pass in front of scanner 118, the scanner scans indicia 34 and communicates the scanned signals back to controller 81 through line 119. If the indicia scanned matches the selected container to be retrieved, the container is transferred onto retrieval spur conveyor 121 and advanced to retrieval station 122. The operator at retrieval station 122 will then remove container 21 from conveyor 121, if the entire container is to be retrieved. Thus, if the customer wishes to retrieve all of the contents of the container, or if all the documents in the container are to be destroyed, operator will remove the container from conveyor 121 at station 122.

Figure 4:
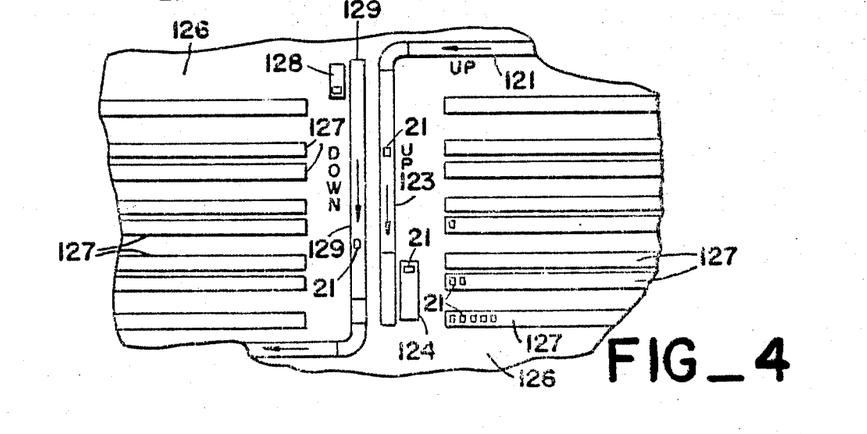
FIG. 4 is a fragmentary top plan view of a mezzanine floor used as suspense storage superimposed over the layout of FIG. 3.

If only a single file 22 or document is to be removed from the plurality of files in container 21, the container continues on conveyor 121 to an inclined belt conveyor 123, which advances the container to a suspense retrieval work station 124, shown in FIG. 4. Work station 124 is located on a mezzanine level 126 above the palletizer, depalletizer and conveyor loops which have been previously described. Thus, mezzanine level 126 includes a plurality of container storage racks 127 having locations at which individual containers can be temporarily stored. An operator at station 124 will open container 21 and remove the file identified by a retrieval order. A "out" card will then be placed in the container in place of the file removed, and the container positioned in suspense storage racks 127 at a location which is identified and correlated to the container by controller 81. Odd size containers may be similarly forwarded to suspense inventory by transferring them from station 116 to conveyor 121.

Returning to scanner 118, the remainder of the containers which have been removed at palletizer 73 and which have not been selected for retrieval will continue on conveyor 74 past spur 121 to merging station 99. Containers on conveyor 74 are then merged with containers on conveyor 91 and input by conveyor 100 into palletizer 51.

It is an important and essential feature of the storage and retrieval apparatus and method of the present invention, therefore, that the remainder of the removed, but not retrieved, containers are immediately recycled or returned to palletizer 51. At palletizer 51 they are scanned again by scanner 103, which communicates the identifying indicia of the containers to computer 82. The computer then correlates the containers with a newly assigned pallet, or pallets, scanned by scanner 104, and when the loaded pallet reaches scanner 108, computer 82 assigns a newly selected location in storage volume 62 for positioning of the loaded pallet in the long term storage inventory.

Similarly, the remainder of the containers on the odd size container pallets at station 116 are immediately recycled into long term inventory. At odd size depalletizing station 116, only those containers required to be removed to reach the selected containers are taken off the pallet manually. All of the removed containers, except those to be retrieved, are replaced upon the pallet and the pallet transported by forklift, to odd size palletizing station 98. At station 98 new containers are added to the retrieved pallet to replace the containers removed at station 116. The retrieved pallet's identifying indicia is scanned by scanner 90, as are the newly added containers. Controller 81 correlates the new containers, and retains the old, with the retrieved pallet, and the pallet is again input by conveyors 101 and 54 to shrinkwrapper 56. When the recycled pallet having some old containers and some new reaches scanner 108, a newly selected address is assigned to the recycled pallet.

While it is statistically possible for a container to be depalletized and then repalletized on the same pallet, or for odd size containers to remain on the same pallet, and have computer 82 assign that pallet to the same location, it will be immediately apparent that this possibility is only of statistical importance. In the storage and retrieval system of the present invention, recycling of containers will normally result in their assignment to a new location in the storage volume usually on a new pallet, with the controller reassigning the location and storing the new correlation of container, pallet and storage address in the memory of the controller. The containers and pallets, therefore, are dynamically circulating through the storage volume as a result of the retrieval of selected containers from the pallets carrying a plurality of containers and the immediate recycling of the remainder or non-selected containers. This allows the controller to immediately fill gaps or voids which result from retrieval. As a location 111 opens because the pallet originally located at 111 is being retrieved to remove one or two containers, computer 82 can immediately assign a new pallet to location 111. The gap produced by retrieval, therefore, is very temporary, and the path and time required to reach the gaps can be thereby minimized, with and the density of the storage volume accordingly maximized. This system also avoids, for all but the odd size containers, the complexity of trying to remove one container from the pallet, in the worst case the middle container from the bottom layer, and to replace all of the remaining containers back on the same pallet before restoring the pallet to inventory. Moreover, even for odd size pallets, the filling of the pallet and reassigning of an address, minimizes the duration of the gaps produced by retrieval.

Returning to the containers held in the suspense inventory shown in FIG. 4, when the document is returned by the customer, the retainer is pulled from the suspense storage racks and taken to the container return station 128. The out guide or card is removed and the document replaced in the container in its original position. Container lid 27 is replaced on the container, and a container loaded on down conveyor 129 for return via conveyor loop 131 to input conveyor 91. Merging of containers 24 from conveyor loop 131 to input conveyor 91 is controlled by a "traffic cop" or mechanical merging device. As will be seen, the container merges back into the system in advance of scanner 94. If the returning container is an odd size container, it will be directed out onto odd size container spur 97. If it is a standard container, it will continue on via conveyor 91 to the palletizer.

E. CONTROL SLIPS

Figure 5:
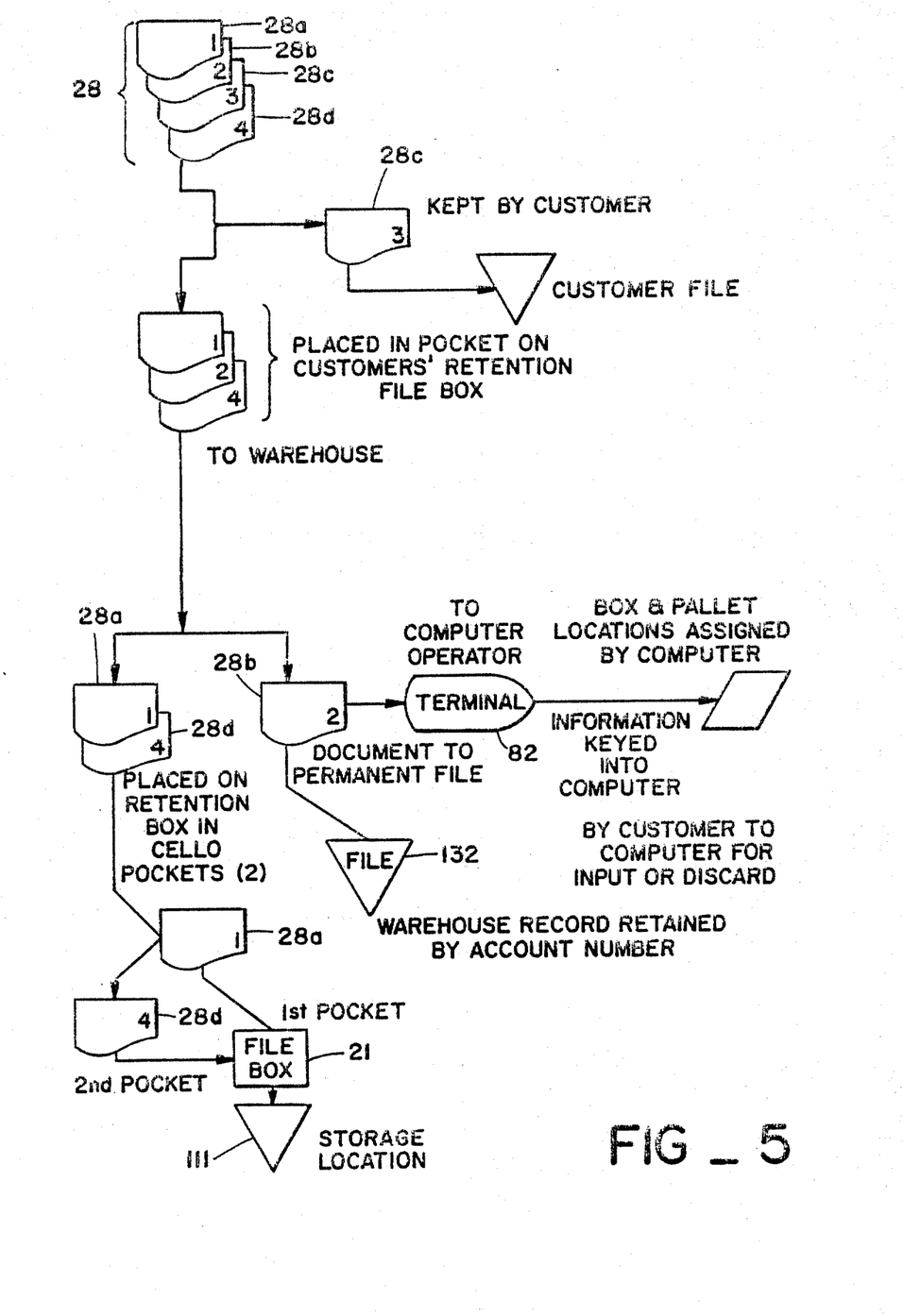
FIG. 5 is a schematic flow chart of the control documents used in the storage and retrieval system of the present invention.

Use of the control slips or warehousing transmittal documents 28 in association with the storage and retrieval system of the present invention can best be understood by reference to FIG. 5. It is preferable that control slip 28 be provided by a set of four forms, which are simultaneously filled by the customer with carbons or the like providing a write-once system. The first copy 28a is a container copy which has machine readable indicia 34 and human readable indicia 36 preprinted thereon. Copy 28a is placed in one of the two pockets on the side of the container. The second copy 28b need not have machine readable code, but does include human readable indicia 36, as well as spaces for all of the information desired concerning the client, the records which are stored in the container and the destruction date of the materials. Form 28c is the customer's copy which also includes indicia 36, but need not include machinery readable indicia 34. Finally, the fourth form set 28d is another container copy which is mounted in the second pocket on the container.

The customer loads the container and then fills out the control slip set 28 with the appropriate information.

Copy 28c is placed in the customer's file and the remaining three copies may be placed in either of the pockets 32 on container 24. The container is then transported to the storage facility and either the driver picking up the document or an operator at the storage facility will place copy 28a in one pocket and copy 28d in another pocket 32. Copy 28b is forwarded to the computer operator for input at computer 82.

The computer operator inputs all the data concerning the container including its identifying indicia. This input is stored and computer 82 looks for a match of the identifying indicia scanned by scanner 103 with data input at the computer based upon control slip 28b. When a match is achieved, the data is stored with signals indicating the current pallet and current address of the container. If input data is not matched, the warehouse operators will know that the container did not reach scanner 103.

Similarly, if a container is scanned by scanner 103 for which there is no manually input data, the container can be held, checked as to content and identity and manually input into computer 82. After computer input, copy 28b of multipart form 28 is then placed in the contractor's copy file 132.

Copies 28a and 28d remain in the pockets of the container while the container is conveyed through the system and positioned in a location 111 in the storage structure assigned by computer 82.

Retrieval of containers is similarly preferably accomplished by a multi-part retrieval document, in this case a five-copy document. The customer may telephone a retrieval order to the storage facility or communicate directly with computer 82 through use of the customer's own computer and modem. The customer's identity is verified by the operator, who then inputs terminal 82 with the container identifying indicia. Computer 82 then creates the five part retrieval document, including printing on the document set a human readable address in suspension storage racks 127 at which containers from which files are to be removed will be stored. The retrieval slips generated by the computer also will include shipping instructions to the customer.

One of the five copies of the retrieval slip will be used as a billing copy by the storage contractor, one is used as a shipping copy. One copy is placed in pocket 32 in the front of the container, and one copy is used as an out card. The final copy will accompany the file retrieved.

If the entire container is to be shipped to the customer, computer 82 prints the retrieval copies at a printer (not shown) located at retrieval station 122. A copy is placed in pocket 32, another shipping copy sent to the customer, the billing copy forwarded to billing and two copies are destroyed.

If a file is to be pulled from the container, the five part retrieval document is printed by a printer (not shown) at station 124, complete with the suspension storage address. The suspension storage operator will remove the file and place an out guide or card in place of the file. A copy of the retrieval slip is positioned in the out guide, a copy is inserted into pocket 32, and the shipping copy and the final copy go to the customer. The billing copy is sent to billing.

The customer must return the file with one of the shipping and final copies to place the file back in inventory. When the file returns with a copy of the retrieval slip, the suspense storage operator reads the container address from the returned retrieval slip and pulls the container from racks 127. The file is then returned to the out guide position. If more than one file has been removed, the container is replaced in the same location until all of the out guides are removed. Once all the removed files are replaced, the operator takes the file to return station 128 and pulls the copy of the retrieval slip from end wall pocket 32 and returns the container to the system via conveyor 129. The returned copy, out guide copy and end wall copy are stapled together and form a billing slip for the re-store and a permanent record for the storage contractor.

Since management of the suspension inventory is labor intensive as compared to the long term inventory, containers are preferably kept in the suspension inventory for a limited period of time, e.g., 3 or 4 months. Experience shows that about 6,000 containers per month will be retrieved from a one million case inventory and have files removed. Thus, suspense inventory rack 127 preferably have spaces for about 24,000 containers. After 3 months, controller 81 will automatically call for retrieval of the suspense inventory container. The container will be returned to long term storage structure 62 without the removed files and the customer notified. The customer will then have to retrieve the container again if and when the file is to be returned to the container.

Another important feature of the system of the present invention is that container control slips 28 also can include instructions as to when the contents can be destroyed to reduce the customer's storage costs. The computer will print out lists of containers to be destroyed, and the customer can confirm destruction prior to the act taking place. The controller or computer then stores identifying indicia for the containers for which destruction has been confirmed. Every time a pallet is retrieved based upon a customer's retrieval order the 55 containers also are compared against the destruct list, and the containers to be destroyed sorted with the containers to be retrieved onto conveyor 121. This allows the normal retrieval process to automatically effect a reduction in the volume of containers destroyed. As will be appreciated, controller 81 also can be used to retrieve containers for destruction without a customer retrieval request, for example, any time 5 (or any other number) or more containers to be destroyed are on one pallet.

Using the storage and retrieval documents together with computer 82, which will conventionally have the capability of printing hard copy reports as to each client's inventory of stored containers, an accurate and well controlled tracking of containers that are dynamically moving in the long term inventory of stored containers can be maintained. Obviously part of this process also will include regular backing up of the computer memory and data.

What is claimed:

1. A method of minimizing the volume required to store an inventory of containers having articles therein which must be periodically retrieved from said inventory, said method including the steps of storing a plurality of containers each having at least one of said articles therein and each having container identifying indicia thereon in a storage structure having a plurality of locations with location identifying addresses, and periodically retrieving selected containers from said storage structure, wherein the improvement in said method comprises the steps of:

a. prior to said storing step, placing a selected maximum number, in excess of one, of said containers on pallet means, said maximum number corresponding to the volume of said containers and pallet means which can be stored at each of said locations;

b. correlating all of the container identifying indicia of said containers on said pallet means with a location identifying address for a selected location in the storage structure;

c. during said storing step, storing said pallet means in said selected location;

d. during said retrieving step, retrieving said pallet means having a selected container thereon;

e. after said retrieving step, removing all of said containers from the retrieved pallet means;

f. after said removing step, sorting said selected container from the remainder of said containers removed from said pallet means; and g. returning said remainder of said containers to said inventory by placing said remainder of said containers on a newly selected pallet means, adding containers to said newly selected pallet means until said maximum number of containers is placed on said pallet means, returning the newly selected pallet and containers to a new location in said storage structure, and correlating the container identifying with the address of said new location in said storage structure.

2. The method of claim 1 wherein,
said storing step is accomplished by assigning an empty location in said storage structure for said pallet means which location is positioned in said storage structure so as to require substantially the shortest conveying time from the position at which said containers are placed on said pallet means, and conveying said pallet means to the assigned location.

3. The method of claim 1 wherein,
said container identifying indicia are machine readable, and
said storing step includes the step of scanning said container identifying indicia with scanning means, inputting signals from said scanning means representing said container identifying indicia to a digital computer, and assigning an address for storing of said pallet means by said computer,
said correlating step is accomplished by storing said signals from said scanning means in said computer with a signal representing the assigned address, and
said storing and retrieving steps are accomplished by conveying means controlled by said computer.

4. The method of claim 1 wherein,
said container means each have machine readable size designating indicia thereon, and
said placing step includes the steps of scanning said containers by scanning means to determine the size of said containers, sorting said containers by size based upon said scanning step, and conveying containers of the same size by conveying means to palletizing means for placing of said maximum number of said containers of the same size on said pallet means.

5. The method of claim 4 wherein,
after said scanning step, manually placing containers of a size different from said same size on pallet means, and conveying said pallet means to conveying means for said containers of said same size at a position downstream of said palletizing means.

6. The method of claim 4 wherein,
said container identifying indicia are machine readable, and
prior to said placing step, scanning each of said containers by scanning means formed to read said container identifying indicia and generate container identifying signals based thereon, and
thereafter, communicating said signals to control means having a signal storing memory therein.

7. The method of claim 6 wherein,
said pallet means each have machine readable pallet identifying indicia thereon, and
prior to storing of said pallet means at said location, scanning said pallet means with scanning means formed to generate pallet identifying signals based thereon, and
thereafter communicating said signals to said control means for storing in said signal storing memory.

8. The method of claim 1 wherein,
said container identifying indicia are machine readable, and said isolating step is accomplished by conveying said containers removed from said pallet means past scanning means, scanning said containers for said container identifying indicia, communicating container identifying signals from said scanning means to control means, comparing scanned signals to input identifying said selected container by said control means, communicating control signals to said conveying means from said control means to convey said selected containers to a retrieval station upon the presence of a match in said input and said scanned signals, and conveying said remainder of said container means to palletizing means for placing on said newly selected pallet means when said input and said scanned signals do not match.

9. The method of claim 1 wherein,
said containers contain a plurality of different articles, and
said sorting step includes conveying said selected containers to a retrieval station, removing a selected article from said container, and storing said selected container with the remainder of said articles therein at a known location in a suspense storage structure.

10. The method of claim 9 wherein,
after said step of storing of said selected container, retrieving said selected container from said suspense storage structure, returning said selected article to said selected container, and conveying said selected retainer to palletizing means for said placing step.

11. The method of claim 1, and
after said placing step and prior to said storing step, shrinkwrapping said pallet means with said containers thereon with a film, and
prior to said removing step, stripping said film from said pallet means and said containers.

* * * * *

UNITED STATES PATENT AND TRADEMARK OFFICE
CERTIFICATE OF CORRECTION

PATENT NO. : 4,786,229

DATED : November 22, 1988

INVENTOR(S) : Thomas R. Henderson

It is certified that error appears in the above-identified patent and that said Letters Patent are hereby corrected as shown below:

Col. 6, line 28, delete "4" and insert ---43---.

Col. 10, line 43, after "103" delete "85".

Col. 10, line 56, delete "10" and insert ---108---.

Claim 1, Col. 17, next to last line of claim, after

"identifying" insert ---indicia---.

Signed and Sealed this

Twenty-eighth Day of March, 1989

Attest:

DONALD J. QUIGG

Attesting Officer

Commissioner of Patents and Trademarks